United States Patent
Leland et al.

(10) Patent No.: US 9,701,801 B2
(45) Date of Patent: Jul. 11, 2017

(54) USE OF NUCLEATION TO IMPROVE SLIP BLOOM IN METALLOCENE POLYPROPYLENE RESINS

(71) Applicant: FINA TECHNOLOGY, INC., Houston, TX (US)

(72) Inventors: Mark Leland, Houston, TX (US); Ruby L. Curtis, League City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/933,026

(22) Filed: Nov. 5, 2015

(65) Prior Publication Data

US 2017/0130015 A1    May 11, 2017

(51) Int. Cl.
| | |
|---|---|
| C08J 5/18 | (2006.01) |
| B29B 13/00 | (2006.01) |
| B29C 47/00 | (2006.01) |
| C08K 5/098 | (2006.01) |
| C08K 5/20 | (2006.01) |
| B29B 13/02 | (2006.01) |
| B29C 47/88 | (2006.01) |
| B29K 23/00 | (2006.01) |
| B29L 7/00 | (2006.01) |

(52) U.S. Cl.
CPC .............. *C08J 5/18* (2013.01); *B29B 13/022* (2013.01); *B29C 47/0004* (2013.01); *B29C 47/0057* (2013.01); *B29C 47/8845* (2013.01); *C08K 5/098* (2013.01); *C08K 5/20* (2013.01); *B29K 2023/12* (2013.01); *B29L 2007/008* (2013.01); *C08J 2323/12* (2013.01)

(58) Field of Classification Search
None
See application file for complete search history.

(56) References Cited

U.S. PATENT DOCUMENTS

| | | | | |
|---|---|---|---|---|
| 5,393,814 A | * | 2/1995 | Chen | C08K 5/20 524/219 |
| 2006/0189744 A1 | * | 8/2006 | Tse | C08K 5/01 524/447 |
| 2006/0247332 A1 | * | 11/2006 | Coffey | C08J 3/18 523/351 |

OTHER PUBLICATIONS

Polypropylene Cast Film, Borealis, published in 2006.*
George W. Schael, Journal of Applied Polymer Science, 2003, 10(4), 653-661.*

* cited by examiner

*Primary Examiner* — Vu A Nguyen
(74) *Attorney, Agent, or Firm* — Albert Shung

(57) ABSTRACT

A process includes combining a metallocene catalyzed polypropylene with a nucleator and a slip agent to form a composition, and forming a cast film from the composition. The slip agent may exhibit an increased slip bloom rate within the cast film relative to the slip bloom rate exhibited by the slip agent in an otherwise identical cast film in which the nucleator is not present in the cast film. The cast film may exhibit a coefficient of friction that is less than a coefficient of friction of an otherwise identical cast film in which the nucleator is not present in the cast film.

12 Claims, 1 Drawing Sheet

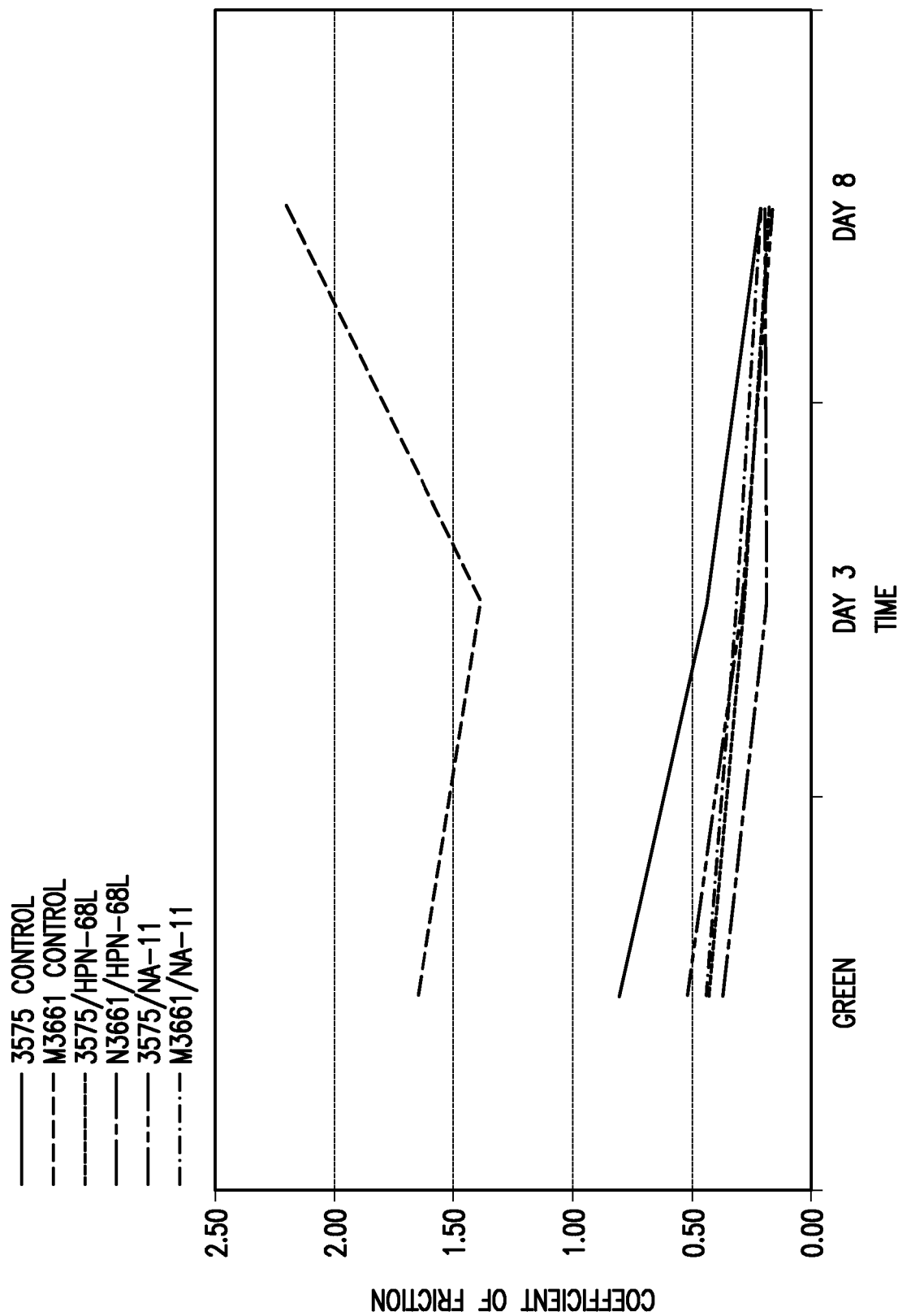

USE OF NUCLEATION TO IMPROVE SLIP BLOOM IN METALLOCENE POLYPROPYLENE RESINS

CROSS-REFERENCE TO RELATED APPLICATIONS

Not applicable.

FIELD

Embodiments of the present disclosure generally relate to cast films of polypropylene. More particularly, embodiments relate to cast films of nucleated metallocene catalyzed polypropylene.

BACKGROUND

A variety of products utilize polyolefin materials in various manufacturing processes to create a variety of finished goods including cast films. Cast films are typically used in the wrapping or packaging of various products in commerce. Cast films may be used in many types of applications, such as packaging, stretch films, diaper backing, labels, release liners, toys, games, sporting goods, medical devices, and food containers among many others.

Slip agents may be used in the manufacture of cast films to modify the coefficient of friction of the final film. Typically, cast films produced with metallocene catalyzed polypropylene exhibit a higher coefficient of friction than cast films produced with Ziegler-Natta catalyzed polypropylene, including when the cast films contain the same type and amount of slip agent.

SUMMARY

The present disclosure provides for a process. The process includes combining a metallocene catalyzed polypropylene with a nucleator and a slip agent to form a composition. The process includes forming a cast film from the composition.

The present disclosure provides for a process for increasing a slip bloom rate of a slip agent in a cast film and for decreasing a coefficient of friction of the cast film. The process includes combining a metallocene catalyzed polypropylene with a nucleator and the slip agent to form a composition. The process includes forming the cast film from the composition. The slip agent exhibits an increased slip bloom rate within the cast film relative to the slip bloom rate exhibited by the slip agent in an otherwise identical cast film in which the nucleator is not present in the cast film. The cast film exhibits a coefficient of friction that is less than a coefficient of friction of an otherwise identical cast film in which the nucleator is not present in the cast film.

The present disclosure provides for a cast film. The cast film includes a metallocene catalyzed polypropylene, a slip agent, and a nucleator.

The present disclosure provides for a cast film. The cast film includes a metallocene catalyzed polypropylene, a slip agent, and a nucleator. The slip agent exhibits an increased slip bloom rate within the cast film relative to the slip bloom rate exhibited by the slip agent in an otherwise identical cast film in which the nucleator is not present in the cast film. The cast film exhibits a coefficient of friction that is less than a coefficient of friction of an otherwise identical cast film in which the nucleator is not present in the cast film.

BRIEF DESCRIPTION OF DRAWINGS

The present disclosure may be understood from the following detailed description when read with the accompanying FIGURE.

FIGURE depicts a graph of coefficient of friction versus time in accordance with the Example.

DETAILED DESCRIPTION

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure relate to a process. The process may include combining a metallocene catalyzed polypropylene with a nucleator and a slip agent to form a composition. The combining may include compounding the metallocene catalyzed polypropylene with the nucleator and the slip agent. The compounding may include melt compounding the metallocene catalyzed polypropylene with the nucleator and the slip agent. In some embodiments, melt-compounding may be performed by melt extrusion of the composition in an extruder, such as a single or twin screw extruder. The metallocene catalyzed polypropylene, nucleator, and slip agent may be combined in any order. For example and without limitation, the nucleator and slip agent may be combined first, and subsequently combined with the metallocene catalyzed polypropylene. The metallocene catalyzed polypropylene may be combined with the nucleator first, and subsequently combined with the slip agent. The metallocene catalyzed polypropylene may be combined with the slip agent first, and subsequently combined with the nucleator. Also, the metallocene catalyzed polypropylene may be simultaneously combined with the nucleator and slip agent.

The process may include forming a cast film from the composition. Forming the cast film may include extruding the composition in a molten state through a slot or die with one or more orifices. The composition may exit through the slot or die as a molten plaque and be uniaxially stretched while being taken up onto a chill roller and cooled to produce the cast film. The chill roller may be water-cooled, chrome-plated, or both. In some embodiments, air from an air knife or vacuum box may contact the molten plaque on the chill roller to cool or quench the molten plaque. Extrusion of the molten composition may occur at a temperature ranging from 150° C. to 350° C., 180° C. to 350° C., 160°

C. to 275° C., 175° C. to 225° C., 190° C. to 280° C., 200° C. to 250° C., or 200° C. to 215° C., for example.

In some embodiments, the metallocene catalyzed polypropylene is in the form of polymer pellets or fluff when added to the extruder. In some embodiments, the metallocene catalyzed polypropylene, nucleator and slip agent are combined in the same extruder within which extrusion of the cast film occurs.

In some embodiments, the process includes use of multiple extruders that extrude more than one layer that are contacted together after extrusion to produce a multilayered film that can be collectively taken up onto a chill roller where it is cooled to produce a multilayered cast film. Bonding layers or adhesives may be used between layers of the multilayered cast film. In some embodiments, no bonding layers or adhesives are used between layers of the multilayered cast film.

The metallocene catalyzed polypropylene may be present in the composition in an amount ranging from 80 to 99.9 weight percent, 85 to 98 weight percent, or 90 to 95 weight percent, all based on a total weight of the composition.

The metallocene catalyzed polypropylene may have at least 50 weight percent, or at least 60 weight percent, or at least 70 weight percent, or at least 75 weight percent, or at least 80 weight percent, or at least 85 weight percent, or at least 90 weight percent, or at least 95 weight percent, or at least 99 weight percent, or 100 weight percent propylene relative to a total weight of metallocene catalyzed polypropylene.

The metallocene catalyzed polypropylene may be a propylene homopolymer, a propylene random copolymer, or a propylene impact copolymer. In some embodiments, the metallocene catalyzed polypropylene may be a "mini-random" polypropylene. A mini-random polypropylene has less than about 1.0 weight percent of comonomer.

In some embodiments, the metallocene catalyzed polypropylene is a syndiotactic polypropylene, an isotactic polypropylene, or an atactic polypropylene. As used herein, the term "isotactic polypropylene" refers to polypropylene in which all the substituents are located on the same side of the polymer chain. As used herein, the term "syndiotactic polypropylene" refers to polypropylene in which the substituents have alternating positions along the polymer chain. As used herein, the term "atactic polypropylene" refers to polypropylene in which the substituents are randomly distributed at positions along the polymer chain.

As used herein, "metallocene catalyzed polypropylene" refers to a polypropylene that has been catalyzed in the presence of a metallocene catalyst. Metallocene catalysts may be characterized as coordination compounds incorporating one or more cyclopentadienyl (Cp) groups coordinated with a transition metal through π bonding. The Cp groups may be substituted or unsubstituted. For substituted Cp groups, each substitution may be the same or different. The substituent groups on the Cp groups may be linear, branched or cyclic hydrocarbyl radicals. The cyclic hydrocarbyl radicals may further form other contiguous ring structures, including, but not limited to, indenyl, azulenyl and fluorenyl groups. These contiguous ring structures may be further substituted or unsubstituted by hydrocarbyl radicals, such as $C_1$ to $C_{20}$ hydrocarbyl radicals. Metallocene catalysts are often employed as unsupported or homogenous catalysts, although they may also be employed in supported catalyst components. Metallocene catalysts may be used with aluminoxanes as cocatalysts or activators, such as methylaluminoxane (MAO). In some embodiments, the Cp groups may be bound to a metal selected from hafnium, lanthanoid, and transition metals of groups IVA, VA, and VIA.

Lumicene® M3661 is an example of a metallocene catalyzed polypropylene in accordance with certain embodiments. Lumicene® M3661 is a metallocene catalyzed isotactic propylene homopolymer. Lumicene® M3661 is available from Total Petrochemicals & Refining USA, Inc. Table 1 lists some typical properties of Lumicene® M3661.

TABLE 1

| Lumicene ® M3661 | | |
| --- | --- | --- |
| Property | Test Method | Unit |
| Melt Flow | D-1238 (2.16 kg, 230° C.) | 14 g/10 min. |
| Tensile Strength at Break - Machine Direction | D-882, A | 5800 psi |
| Tensile Strength at Break - Transverse Direction | D-882, A | 5500 psi |
| Elongation at Break - Machine Direction | D-882, A | 720% |
| Elongation at Break - Transverse Direction | D-882, A | 810% |
| 1% Secant Modulus - Machine Direction | D-882, A | 81 kpsi |
| 1% Secant Modulus - Transverse Direction | D-882, A | 82 kpsi |
| Haze | D-1003 | 0.4% |
| Gloss, 45° | D-2457 | 81 |
| Density | D-1505 | 0.9 g/cc |
| Melting Point | DCS-2 Differential Scanning Calorimeter | 302F (150° C.) |

In Table 1, the tensile strength at break, elongation at break, 1% secant modulus, haze, and gloss, 45° were determined on a 2 mils (50 µm) non-oriented film.

In embodiments, the metallocene catalyzed polypropylene may have a density of from 0.895 g/cc to 0.920 g/cc, from 0.900 g/cc to 0.915 g/cc, from 0.905 g/cc to 0.915 g/cc, or 0.9 g/cc as determined in accordance with ASTM D1505; a melting point of from 145° C. to 170° C., from 150° C. to 168° C., from 160° C. to 165° C., or 150° C. as determined by differential scanning calorimetry; and a melt flow rate of from 0.5 g/10 min. to 50 g/10 min., or from 1.0 g/10 min. to 25 g/10 min., or from 1.5 g/10 min. to 15.0 g/10 min., or 14 g/10 min as determined in accordance with ASTM D1238 condition "L" (2.16 kg, 230° C.).

The nucleator may be present in the composition in an amount ranging from 0.05 to 10 weight percent, 0.05 to 5 weight percent, 0.8 to 4 weight percent, or 1.0 to 3.5 weight percent, or 0.06 weight percent, each based on the total weight of the composition.

The nucleator may be a carboxylic acid salt, including sodium benzoate; talc; silica; zinc oxide; a phosphate; a metallic-silicate hydrate; an organic derivative of dibenzylidene sorbitol; a sorbitol acetal; an organophosphate salt; or combinations thereof. For example and without limitation, the nucleator may be AMFINE® Na-11®, commercially available from Amfine Chemical; or and HYPERFORM® HPN-68L, commercially available from Milliken Chemical; or combinations thereof. Na-11® is or contains sodium 2,2'-methylene-bis-(4,6-di-tert-butylphenyl) phosphate. HYPERFORM® HPN-68L is or contains the chemical structure (I):

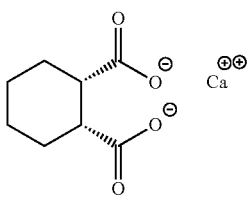

(I)

In some embodiments, the nucleator is sodium 2,2'-methylene-bis-(4,6-di-tert-butylphenyl) phosphate. In some embodiments, the nucleator has the chemical structure (I). Other examples of commercially available nucleators that may be used include, but are not limited to: Millad® 3988 (1,3:2,4-bis(3,4-dimethylbenzylidene)sorbitol), Millad® 3940 (1,3-2,4-di-(4-tolylidene)-D-sorbitol), Millad® 3905 (1,3-2,4-di-(benzylidene)-D-sorbitol), Millad® NX8000, and HYPERFORM® HPN 20e (containing 1,2-cyclohexanedicarboxylic acid calcium salt), each available from Milliken Chemicals; Irgaclear® XT 386 (1,3,5-tris-[2,2-dimethylpropionylamino]benzene), commercially available from Ciba®; and ADK NA-21, ADK NA-27, and ADK NA-71, which are phosphate salts commercially available from Amfine Chemicals. The slip agent may be an additive that provides surface lubrication during and immediately following processing, such as extrusion, of the composition. The slip agent may be present in the composition in an amount ranging from 0.05 to 10 weight percent, 0.05 to 5 weight percent, 0.1 to 3 weight percent, or 0.1 to 1.0 weight percent, or 0.17 weight percent, all based on the total weight of the composition.

The slip agent may be an amide based slip agent. In some embodiments, the slip agent is a wax. The slip agent may include a stearate, such as calcium or zinc stearate; a stearamide, such as ethylene bis-stearamide (EBS); an oleamide; behenamide; erucamide; or combinations thereof. For example and without limitation the slip agent may be cis-13-docosenoamide.

In certain embodiments, the process includes reducing the coefficient of friction (COF) of a cast film of a composition containing a metallocene catalyzed polypropylene and a slip agent, and increasing a slip boom rate of the slip agent within the cast film. Reducing the COF and increasing the slip boom rate may be performed by adding the nucleator to the composition. COF, sometimes symbolized by $\mu$, is a dimensionless scalar value. COF is the ratio of the force of friction between two bodies and the force pressing the two bodies together. COF may be represented by the following equation: $f=\mu F_n$, in which f is frictional force, $\mu$ is the COF, and $F_n$ is the normal force. As used herein, the COF is measured in accordance with ASTM D1894. For example, the COF of the cast film may be the force required to slide one layer of the cast film across another adjacent layer of the cast film, relative to the force exerted on the cast film. For example and without limitation, the COF may be measured in accordance with ASTM D1894 using commercially available instrumentation known to those skilled in the art, such as the Coefficient of Friction Fixture, Model No. 2810-005, available from INSTRON®. The COFs disclosed herein may be average COFs determined by averaging multiple COF measurements. Without being bound by theory, it is believed that the use of nucleation in conjunction with the slip agent in metallocene catalyzed polypropylene increases the slip bloom rate of the slip agent in the metallocene catalyzed polypropylene, and that the increase in the slip bloom rate decreases the COF. "Slip bloom rate" as used herein refers to the rate of diffusion of the slip agent to a surface of the cast film after extrusion of the cast film.

Certain embodiments relate to a cast film. In some embodiments, the cast film is made by the process described herein. The cast film includes the composition as describe herein, including the metallocene catalyzed polypropylene as described herein, the slip agent as described herein, and the nucleator as described herein.

In certain embodiments, the cast film exhibits a COF that is less than a COF of an otherwise identical cast film in which the nucleator is not present in the cast film. In some embodiments, the cast film exhibits a COF that is at least 99%, 90%, 80%, 70%, 60%, 50%, 40%, 30%, 20% or 10% lower than the COF of an otherwise identical cast film in which the nucleator is not present in the cast film. For example, if the COF for an otherwise identical cast film were 2.5 and the COF for the cast film were 99% lower than the COF of the otherwise identical cast film, then the COF of the cast film would be 0.025.

In some embodiments, the COF of the cast film is less than 1.00, less than 0.90, less than 0.80, less than 0.70, less than 0.60, less than 0.50, less than 0.40, or less than 0.30.

In some embodiments, the COF of the cast film decreases for at least a period of time after formation of the cast film. For example, t=0 may be defined as the time at which formation of the cast film is complete, that is, the time of extrusion of the cast film. In some embodiments, the COF of the cast film is lower when t>0, that is, at a time after formation of the cast film. For at least a portion of time, the COF of the cast film may decrease as t increases. For example and without limitation, the COF of the cast film at 1 day after formation of the cast film may be lower than the COF of the cast film at the time at which formation of the cast film is complete ($COF_{initial}$). The COF of the cast film at 2, 3, 4, 5, 6, 7, 8, 9 and 10 days after formation of the cast film may be lower than $COF_{initial}$. Without being bound by theory, the decrease in the COF of the cast film over time may be due to the migration of the slip agent to the surface of the cast film, resulting in an increasing concentration of the slip agent at the surface of the cast film over time.

In certain embodiments, the cast film exhibits a COF that is equal to or less than a COF of an otherwise identical cast film in which the metallocene catalyzed polypropylene is replaced with a Ziegler-Natta catalyzed polypropylene. As used herein "Ziegler-Natta catalyzed polypropylene" refers to polypropylene polymerized in the presence of a Ziegler-Natta catalyst. Ziegler-Natta catalyst systems may be formed from the combination of a metal component, for example a catalyst precursor, with one or more additional components, such as a catalyst support, a cocatalyst and/or one or more electron donors. An example of a Ziegler-Natta catalyst includes a metal component represented by the formula (II):

$$MR^A_x; \qquad (II)$$

In formula II, M is a transition metal; $R^A$ is a halogen, an alkoxy or a hydrocarboxyl group; and x is the valence of the transition metal. For example, x may be from 1 to 4.

In some embodiments, the cast film is a multilayer cast film, which may be formed by the process described herein. In some embodiments, one or more layers of the multilayer cast film may be a solid substrate, such as paper or cardboard.

Articles may be formed from the cast films disclosed herein. The articles may include, but are not limited to, stretch films, health and hygiene articles (e.g., diapers), release liners, tapes, stand-up pouches, shrink wrap, heavy-duty bags and shipping sacks, carrier envelopes, food packaging, tissue and towel overwraps, pet food backs, industrial films, cling films, personal care films, high clarity films and labels.

In some embodiments, the cast film may contain one or more additives other than the slip agent and nucleator. The additives other than the slip agent and nucleator may include, but are not limited to, fillers such as calcium carbonate; pigments; antioxidants; stabilizers; anti-corrosion agents; UV stabilizing agents; and antiblock agents. In some embodiments, the additives other than the slip agent and nucleator may be present in the cast film or composition in an amount ranging from 0.01 to 5 weight percent, 0.01 to 1 weight percent, or 0.1 to 0.5 weight percent, all based on the total weight of the cast film or composition. In some embodiments, the cast film does not contain any additives other than the slip agent and nucleator.

EXAMPLES

The disclosure having been generally described, the following examples show particular embodiments of the disclosure. It is understood that the example is given by way of illustration and is not intended to limit the specification or the claims. All compositions percentages given in the examples are by weight.

Tests were performed to determine whether the use of nucleation in conjunction with a slip agent in a metallocene catalyzed polypropylene would yield a cast film with a reduced COF relative to an identical metallocene catalyzed polypropylene in the absence of nucleation.

Three samples containing an isotactic metallocene catalyzed polypropylene homopolymer, Lumicene® M3661, were prepared. Sample A was a control sample, and was prepared by compounding Lumicene® M3661 with 0.17 weight percent erucamide (cis-13-docosenoamide) as a slip agent. Sample A did not include a nucleator. After compounding, a 2 mil cast film of Sample A was formed (M3661 Control).

Sample B was prepared by compounding Lumicene® M3661 with 0.17 weight percent erucamide and 0.06 weight percent HYPERFORM® HPN-68L as a nucleator having the chemical structure:

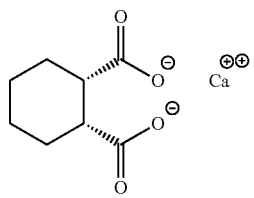 [SMILES: O=C([O-])[C@H]1CCCC[C@H]1C(=O)[O-] ; [Ca+2]]

After compounding, a 2 mil cast film of Sample B was formed (M3661/HPN-68L).

Sample C was prepared by compounding Lumicene® M3661 with 0.17 weight percent erucamide and 0.06 weight percent NA-11® (sodium 2,2'-methylene-bis-(4,6-di-tert-butylphenyl) phosphate) as a nucleator. After compounding, a 2 mil cast film of Sample C was formed (M3661/NA-11).

Additionally, three samples containing a Ziegler-Natta catalyzed polypropylene were prepared. The Ziegler-Natta catalyzed polypropylene used was 3575, which is a controlled rheology polypropylene resin available from Total Petrochemicals & Refining USA, Inc., and had a target melt flow of 14 g/10 min. to match the melt flow of Lumicene® M3661.

Sample D was a control sample, and was prepared by compounding 3575 with 0.17 weight percent erucamide as a slip agent. Sample D did not include a nucleator. After compounding, a 2 mil cast film of Sample D was formed (3575 Control).

Sample E was prepared by compounding 3575 with 0.17 weight percent erucamide and 0.06 weight percent HYPERFORM® HPN-68L as a nucleator. After compounding, a 2 mil cast film of Sample E was formed (3575/HPN-68L).

Sample F was prepared by compounding 3575 with 0.17 weight percent erucamide and 0.06 weight percent NA-11® as a nucleator. After compounding, a 2 mil cast film of Sample F was formed (3575/NA-11).

Cuts of each 2 mil cast film produced from Samples A, B, C, D, E and F were taken for measurement of average COF. The average COF on each film sample was measured over a six inch distance using the Coefficient of Friction Fixture, Model No. 2810-005, available from INSTRON® and BLUEHILL® software, in accordance with ASTM D1894. A cut of each film sample was taped to a base plate of the Coefficient of Friction Fixture, and a second cut of each film sample was attached to the underside of a sled of the Coefficient of Friction Fixture. The sled with the second cut of film was forced across the first cut of film on the base for a distance of six inches, such that the second cut of film slid across the first cut of film. The Coefficient of Friction Fixture and BLUEHILL® software calculated the average COF for each film sample. Testing for each sample was performed until the standard deviation of the COF of at least three runs came within 10% of the mean value. The FIGURE is a graph plotting the COF of the cast films produced for this example versus time (in days). In the FIGURE, "Green" on the x-axis is the time upon formation of the cast films, t=0, that is, the time of extrusion of the cast film. The cast film of Sample A (M3661 Control), has the highest initial COF, which decreases until 3 days after formation of the cast film. After three days from formation of the cast film of Sample A (M3661 Control), the COF begins to increase.

Contrary to the metallocene catalyzed polypropylene control sample, the cast film of Sample D (3575 Control), had a substantially lower initial COF upon formation, and the COF continued to decrease through eight days after formation of the cast film. Thus, cast films containing Ziegler-Natta catalyzed polypropylene and a slip agent exhibit a lower COF than cast films containing metallocene catalyzed polypropylene and a slip agent without a nucleator.

The cast films of Sample B (M3661/HPN-68L) and Sample C (M3661/NA-11) both exhibited initial COFs that were lower than the COF of the cast film of Sample A (M3661 Control) and lower than the COF of the cast film of Sample D (3575 Control). Also, the COFs of the cast films of Sample B (M3661/HPN-68L) and Sample C (M3661/NA-11) continued to decrease through eight days after formation of the cast films.

The cast films of Sample E (3575/HPN-68L) and Sample F (3575/NA-11) both exhibited initial COFs that were lower than the COF of the cast film of Sample D (3575 Control). Also, the COFs of the cast films of Sample E (3575/HPN-68L) and Sample F (3575/NA-11) continued to decrease through eight days after formation of the cast films. Thus, addition of a nucleator to a cast film composition containing Ziegler-Natta catalyzed polypropylene and a slip agent resulted in a decrease in COF in the cast film.

The results demonstrate that a cast film containing a nucleator in combination with a slip agent and metallocene catalyzed polypropylene lowers the COF of cast films relative to an otherwise identical cast film in which the nucleator is not present. Also, the results demonstrate that a cast film containing a nucleator in combination with a slip agent and metallocene catalyzed polypropylene has a COF that is comparable to the COF of a cast film containing Ziegler-Natta catalyzed polypropylene and a slip agent with or without a nucleator.

Thus, this example demonstrates that the addition of a nucleator decreases the COF in both Ziegler-Natta catalyzed polypropylene and metallocene catalyzed polypropylene. However, the change in COF for nucleated samples relative to the COF in the control sample for metallocene catalyzed polypropylene is greater than the change in COF for nucleated samples relative to the COF in the control sample for Ziegler-Natta catalyzed polypropylene.

As is evident from the FIGURE, nucleation may be used in conjunction with a slip agent and metallocene catalyzed polypropylene to reduce the COF of cast films.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A process comprising:
   combining a metallocene catalyzed polypropylene with a nucleator and a slip agent to form a composition, wherein the amount of nucleator combined with the metallocene catalyzed polypropylene is adjusted to achieve a coefficient of friction of less than 0.5; and
   forming a cast film from the composition, wherein the cast film has a coefficient of friction at least 90% less than an otherwise identical cast film in which the nucleator is not present, wherein the coefficient of friction is measured in accordance with ASTM D1894.

2. The process of claim 1, wherein combining the metallocene catalyzed polypropylene with the nucleator and the slip agent comprises melt compounding the metallocene catalyzed polypropylene with the nucleator and the slip agent.

3. The process of claim 1, wherein forming the cast film from the composition comprises extruding the composition in a molten state through a slot or die with one or more orifices, wherein the composition in the molten state exits through the slot or die as a molten plaque and is uniaxially stretched while being taken up onto a chill roller and cooled to produce the cast film.

4. The process of claim 1, wherein the metallocene catalyzed polypropylene is a homopolymer.

5. The process of claim 1, wherein the metallocene catalyzed polypropylene is present in the composition in an amount ranging from 80 weight percent to 99.9 weight percent, based on a total weight of the composition.

6. The process of claim 1, wherein the nucleator comprises a carboxylic acid salt, talc, silica, zinc oxide, a phosphate, a metallic-silicate hydrate, an organic derivative of dibenzylidene sorbitol, a sorbitol acetal, an organophosphate salt, or combinations thereof.

7. The process of claim 1, wherein the nucleator comprises sodium 2,2'-methylene-bis-(4,6-di-tert-butylphenyl) phosphate; or has the chemical structure:

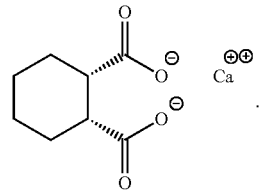 [SMILES: O=C([O-])[C@H]1CCCC[C@H]1C(=O)[O-] ; [Ca+2]]

8. The process of claim 1, wherein the nucleator is present in the composition in an amount ranging from 0.05 weight percent to 10 weight percent, based on a total weight of the composition.

9. The process of claim 1, wherein the slip agent comprises a stearate, a stearamide, an oleamide, behenamide, erucamide, or combinations thereof.

10. The process of claim 1, wherein the slip agent comprises cis-13-docosenoamide.

11. The process of claim 1, wherein the slip agent is present in the composition in an amount ranging from 0.05 weight percent to 10 weight percent, based on a total weight of the composition.

12. A process for increasing a slip bloom rate of a slip agent within a cast film and for decreasing a coefficient of friction of the cast film, the process comprising:
   combining a metallocene catalyzed polypropylene with a nucleator and the slip agent to form a composition;
   forming the cast film from the composition;
   wherein the slip agent exhibits an increased slip bloom rate within the cast film relative to the slip bloom rate exhibited by the slip agent in an otherwise identical cast film in which the nucleator is not present in the cast film; and
   wherein the step of combining a metallocene catalyzed polypropylene with a nucleator comprises adjusting the amount of nucleator to achieve a coefficient of friction that is at least 90% less than a coefficient of friction of an otherwise identical cast film in which the nucleator is not present in the cast film, wherein the coefficient of friction is measured in accordance with ASTM D1894.

* * * * *